Jan. 5, 1937. J. T. URQUHART 2,066,953
FERTILIZER DISTRIBUTOR
Original Filed Nov. 29, 1933 3 Sheets-Sheet 1

Inventor
Jesse Thomas Urquhart
By Ogle R. Singleton
Attorney

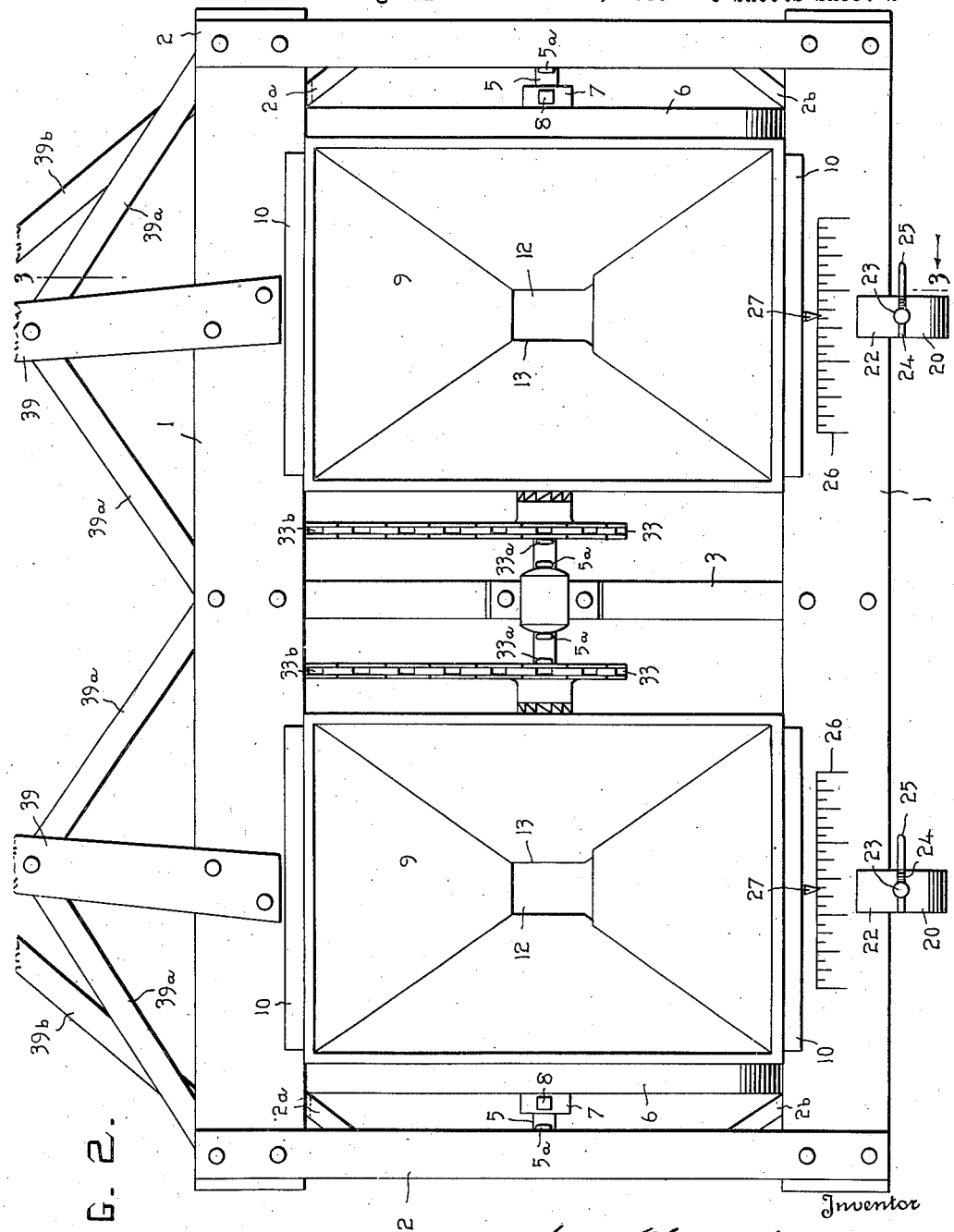

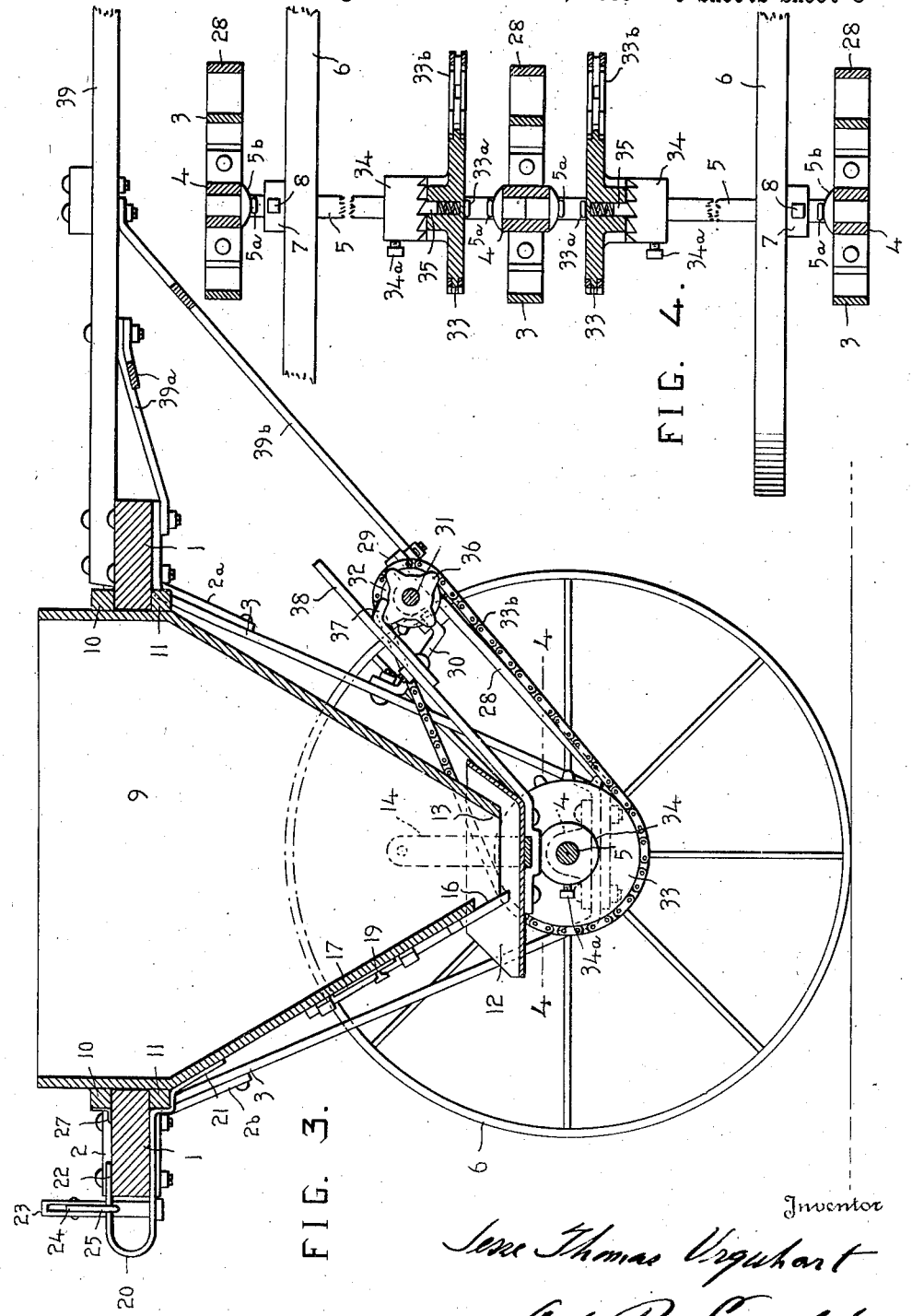

Patented Jan. 5, 1937

2,066,953

UNITED STATES PATENT OFFICE 2,066,953

FERTILIZER DISTRIBUTOR

Jesse Thomas Urquhart, Southampton County, Va.

Application November 29, 1933, Serial No. 700,328
Renewed July 2, 1935

7 Claims. (Cl. 275—2)

My invention consists in a new and useful improvement in fertilizer distributors, and is designed more particularly to provide a machine for distributing fertilizer simultaneously over a plurality of rows of plants, and consequently has means for adjusting the feed hoppers. The particularly novel and useful feature of my device is the means which I provide for vibrating the shaker pans for feeding the material from the hoppers, so designed that the material will feed continuously when the machine is moved forwardly, but will automatically cease feeding, if and when the machine is being turned, either to the right or to the left.

While I have illustrated in the drawings filed herewith and have hereinafter fully described one specific embodiment of my invention, it is to be distinctly understood that I do not consider my invention limited to said specific embodiment, but refer for its scope to the claims appended hereto.

In the drawings:

Fig. 2 is a plan view.

Fig. 3 is a vertical section on the line 3—3 of Fig. 2.

Fig. 4 is an horizontal section on line 4—4 of Fig. 3.

Figure 1:
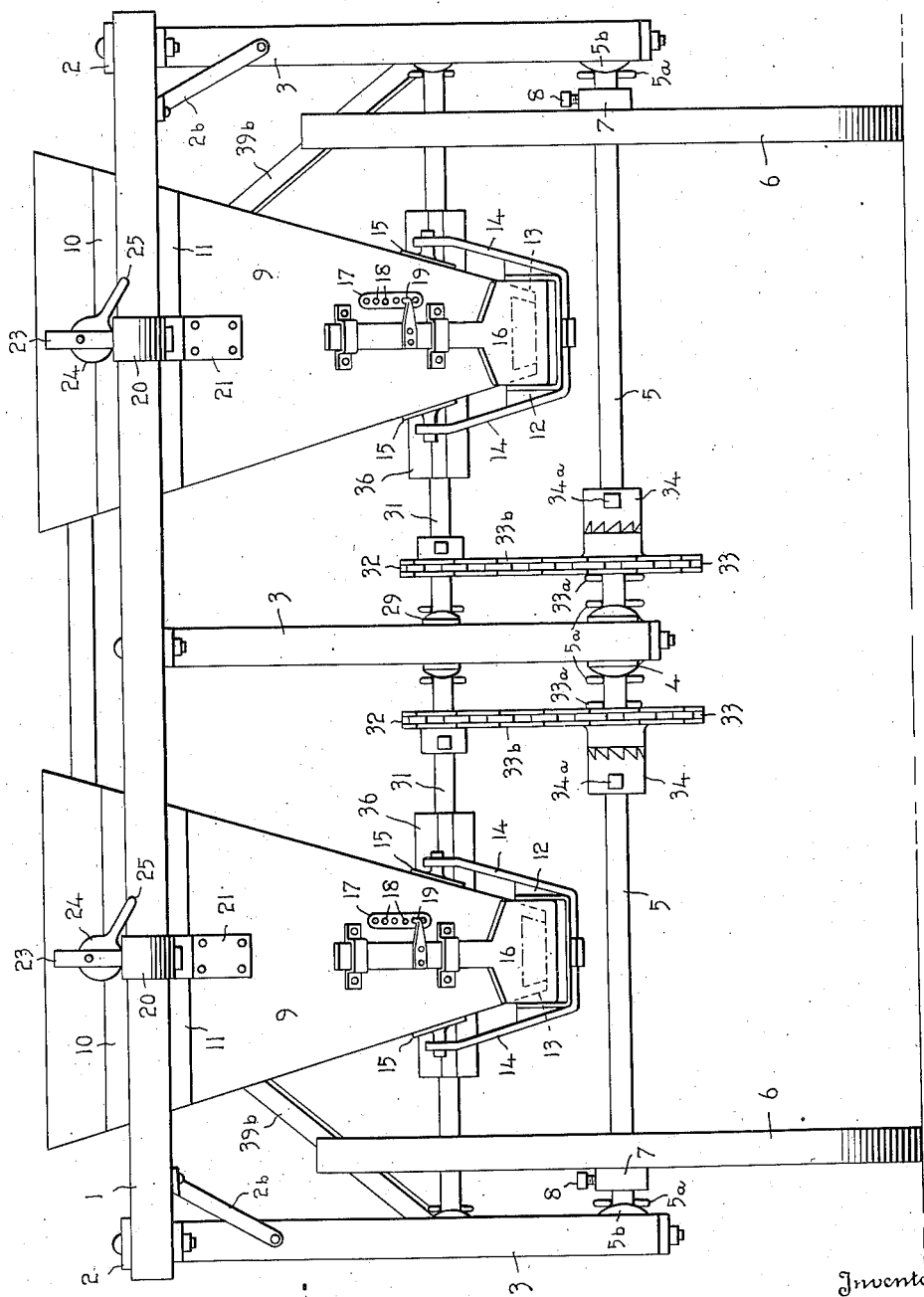
Fig. 1 is a rear elevation of my machine.

As illustrated in the drawings, my machine has a frame composed of the transverse beams I and cross-bars 2 suitably bolted to the beams I at their ends, with corner braces 2—a and 2—b. I provide three V-shaped supporting elements 3 suitably bolted to the under side of the beams I, one element 3 being at each end of the frame and the third element 3 being disposed equidistantly between the other two. In the crotch of each of the elements 3, there is suitably bolted a bearing 4. I provide two shafts 5, one having one end journaled in the bearing 4 at one side of the machine and its other end journaled in one side of the bearing 4 in the middle of the machine, and the other shaft 5 having one end journaled in the bearing 4 at the other side of the machine and its other end journaled in the other side of the bearing 4 in the middle of the machine. I provide cotter pins 5—a and washers 5—b on the shafts 5 to prevent end-wise movement of the shafts 5 in the bearings 4. On each of the shafts 5, there is mounted a traction wheel 6 having the usual form of collar 7 and set-screw 8 for attachment to the shaft 5, so that the wheel 6 is rendered adjustable laterally of the shaft 5. Suitably positioned between the beams I are the two funnel hoppers 9 supported by the flanges 10 slidable on the beams I, and provided with the flanges II bearing against the underside of the beams I. I provide a shaker-pan 12, below the constricted mouth 13 at the bottom of each hopper 9, supported by the bail 14 pivoted on the pintle plates 15 on the hopper 9. Suitably mounted for vertical sliding adjustment on each hopper 9, there is the gate 16 so disposed as to be positioned relative to the pan 12 to vary the discharge opening for the hopper 9. Mounted on each hopper 9, adjacent the gate 16 there is the guage plate 17 having a series of holes 18, and there is provided a spring-pressed locking finger 19 fixed on the gate 16 and adapted to coact with the guage plate 17 to permit locking the gate 16 in various adjusted positions.

Since each hopper 9 is slidable relative to the beams I, I have provided locking means to fix the hoppers 9 in adjusted positions. An U-shaped spring member 20 has its longer branch 21 bolted to the hopper 9 and is disposed so that it arches the beam I, its shorter arm 22 being disposed above the beam I. The slotted bolt 23, bridging the bight of the member 20, has eccentrically mounted in its slot the cam 24 with operating handle 25, so disposed that when the cam 24 is rocked it will constrict the member 20 and cause the end 22 to bind against the beam I, thus locking the hopper 9 against transverse movement relative to the beam I. I also provide a suitable guage 26 with pointer 27 for each hopper 9.

Suitably bolted to the bottom of each of the supporting elements 3, there is a bracket 28 on which is mounted a bearing 29 with a brace 30 from the element 3. Journaled in these three bearings 29, there is the shaft 31 on which are suitably mounted the two chain-cog-wheels 32. Loosely mounted upon each shaft 5 in alignment with one of the wheels 32 there is the chain-cog-wheel 33 with a cotter pin 33—a in the shaft 5 to prevent endwise movement of the wheel 33, and a drive chain 33—b connecting the wheels 32 and 33. Adjacent each wheel 33 there is mounted on the shaft 5, the ratchet collar 34 with set screw 34—a. To coact wtih the ratchet collar 34, the wheel 33 has the spring-pressed dog 35.

It is to be noted that the above-described ratchets, dogs, wheels and shafts are so designed and disposed that when the wheels 6 are rotated in unison in the same direction, viz. when the machine is being moved forwardly, power is transmitted from the traction wheels 8, through the shafts 5 and ratchets 34 to the cog wheels 33, and that when either wheel 6 is rotated reversely, viz. when the machine is being turned about, either by a right turn or by a left turn, the ratchet 34 will idle and the wheel 33 will receive no impulse.

Suitably disposed upon the shaft 31 are the cam-rollers 36, with each of which co-acts the cam shoulder 37 on the rod 38 attached to the shaker pan 12, to vibrate the pan 12 when the shaft 31 is rotated.

As illustrated in the drawings, the frame of my device is provided with shafts 39 for a single draft animal. The shafts 39 are bolted to the forward beam 1 and have braces 39—a, to the beam 1 and braces 39—b to the brackets 28 on the sides of the machine. It is obvious that my machine may be provided with any suitable form of tongue for a pair of draft animals, or with a tractor hitch, instead of the shafts 39.

Having described my invention, what I claim is:

1. In a fertilizer distributor, the combination of a frame; a plurality of hoppers slidably mounted in said frame; a shaker-pan suspended under each hopper; a plurality of frame supports upon which said frame is mounted; a single driven shaft mounted in journals carried by said supports and having fixed thereon vibrators adapted to vibrate said pans when the hoppers are in any of their adjusted positions; a plurality of driving shafts journaled in said frame; a ratchet collar fixed on each driving shaft; a cog-wheel loose on each driving shaft and having a dog to co-act with its associated collar; means to prevent end-wise movement of said cog-wheels; two cog-wheels upon said driven shaft, each being aligned with one of the cog-wheels upon the driving shafts; and driven chains on the respective sets of cog-wheels.

2. In a fertilizer distributor, the combination of a frame; two feed hoppers adjustably mounted in said frame for independent movement longitudinally of said frame; a shaker-pan pivoted to each hopper; a plurality of frame supports upon which said frame is mounted; a single driven shaft mounted in journals carried by said supports and provided with cam rollers; an arm on each pan having thereon a cam shoulder adapted to co-act with one of said rollers to vibrate its pan when the driven shaft is rotated, the rollers and shoulders being so designed and related that they co-act when the hoppers are in any of their adjusted positions; two aligned driving shafts journaled in said frame and provided with traction wheels slidably mounted thereon; a ratchet collar fixed on each driving shaft; a cog-wheel loose on each driving shaft and having a dog to co-act with its associated collar; means to prevent end-wise movement of said cog-wheels; two cog-wheels upon said driven shaft, each being aligned with one of the cog-wheels upon the driving shaft; and driving chains on the respective sets of cog-wheels.

3. In a fertilizer distributor, the combination of a frame; a plurality of hoppers slidably mounted in said frame; a shaker-pan suspended under each hopper; a plurality of frame supports upon which said frame is mounted; a driven shaft mounted in journals carried by said supports; a plurality of vibrators mounted on said shaft and adapted to vibrate said pans when the hoppers are in any of their adjusted positions, and the shaft is rotated; and means adapted to rotate said shaft.

4. In a fertilizer distributor, the combination of a frame; two feed hoppers adjustably mounted in said frame for independent movement longitudinally of said frame; a shaker-pan pivoted to each hopper; a plurality of frame supports upon which said frame is mounted; a driven shaft mounted in journals carried by said supports; two cam rollers on said shaft; an arm on each pan having thereon a cam shoulder to co-act with one of said rollers to vibrate its pan when the driven shaft is rotated; and means adapted to rotate said shaft.

5. In a fertilizer distributor, the combination of a frame; two feed hoppers adjustably mounted in said frame for independent movement longitudinally of said frame; a shaker-pan pivoted to each hopper; a plurality of frame supports upon which said frame is mounted; a driven shaft mounted in journals carried by said supports; two cam rollers fixed on said shaft; an arm on each pan having thereon a cam shoulder adapted to co-act with one of said rollers to vibrate its pan when the driven shaft is rotated, the rollers and shoulders being so related that they co-act when the hoppers are in any of their adjusted positions; and means adapted to rotate said shaft.

6. In a fertilizer distributor, the combination of a frame; two feed hoppers adjustably mounted in said frame for independent movement longitudinally of said frame; a shaker-pan pivoted to each hopper; a plurality of frame supports upon which said frame is mounted; a driven shaft mounted in journals carried by said supports; two elongated cam rollers on said shaft; an arm on each pan having thereon a cam shoulder, the rollers and shoulders being so designed and related that the shoulders, moving along the rollers when the hoppers are adjusted, are constantly in position to be actuated by the rollers when the shaft is rotated; and means adapted to rotate said shaft.

7. In a fertilizer distributor, the combination of a frame; two feed hoppers carried by said frame; a driven shaft journaled adjacent said hoppers; feeding mechanism adapted to distribute fertilizer from said hoppers and actuated by said shaft; two aligned driving shafts journaled adjacent said driven shaft and provided with traction wheels slidably mounted thereon; a ratchet collar fixed on each driving shaft; a cog-wheel loose on each driving shaft and having a dog to co-act with its associated collar; means to prevent end-wise movement of said cog-wheels; two cog-wheels on said driven shaft, each being aligned with one of the cog-wheels on the driving shafts; and driving chains on the respective sets of cog-wheels.

JESSE THOMAS URQUHART.